(12) United States Patent
Liu et al.

(10) Patent No.: US 12,534,423 B2
(45) Date of Patent: Jan. 27, 2026

(54) METHOD FOR PREPARING P-XYLENE

(71) Applicant: DALIAN INSTITUTE OF CHEMICAL PHYSICS, CHINESE ACADEMY OF SCIENCES, Dalian (CN)

(72) Inventors: Zhongmin Liu, Dalian (CN); Zhengxi Yu, Dalian (CN); Yue Yang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 0 days.

(21) Appl. No.: 18/694,415

(22) PCT Filed: Dec. 10, 2021

(86) PCT No.: PCT/CN2021/137211
§ 371 (c)(1),
(2) Date: Mar. 22, 2024

(87) PCT Pub. No.: WO2023/045105
PCT Pub. Date: Mar. 30, 2023

(65) Prior Publication Data
US 2024/0317658 A1 Sep. 26, 2024

(30) Foreign Application Priority Data
Sep. 24, 2021 (CN) .......................... 202111122218.0

(51) Int. Cl.
*C07C 15/00* (2006.01)
*B01J 29/40* (2006.01)
(Continued)

(52) U.S. Cl.
CPC ............... *C07C 15/08* (2013.01); *B01J 29/40* (2013.01); *B01J 37/0201* (2013.01); *C07C 2529/40* (2013.01)

(58) Field of Classification Search
CPC ........ B01J 29/40; B01J 37/0201; C07C 15/08
See application file for complete search history.

(56) References Cited

U.S. PATENT DOCUMENTS

| 9,505,676 B2 | 11/2016 | Mohr et al. |
| 2004/0249226 A1* | 12/2004 | Wu ........................ C07C 2/864 585/24 |
| 2018/0346394 A1 | 12/2018 | Almusaiteer et al. |

FOREIGN PATENT DOCUMENTS

| CN | 102199446 A | 9/2011 |
| CN | 102531821 A | 7/2012 |

(Continued)

OTHER PUBLICATIONS

Li et al., CO2 Atmosphere-enhanced Methanol Aromatization over the NiO—HZSM-5 Catalyst (Sep. 2014) (Year: 2014).*

(Continued)

*Primary Examiner* — Prem C Singh
*Assistant Examiner* — Brandi M Doyle
(74) *Attorney, Agent, or Firm* — Bayramoglu Law Offices LLC

(57) ABSTRACT

A method for preparing p-xylene is provided. Raw materials containing methanol, naphtha and $CO_2$ are introduced into a reactor filled with a catalyst for a reaction to produce p-xylene. By adding the methanol, the product distribution is adjusted, and the selectivity of p-xylene is obviously improved. In addition, components containing benzene and toluene in aromatic hydrocarbon products are returned to a reaction system and co-fed with the raw materials for a reaction to produce p-xylene, so that cyclic utilization of the raw materials is achieved, and the method has extremely (Continued)

high economic benefits. The method has a simple process and high feasibility, can greatly improve the selectivity and yield of p-xylene, has an important application value, and provides a new way for large-scale utilization of $CO_2$.

19 Claims, 1 Drawing Sheet

(51) Int. Cl.
*B01J 37/02* (2006.01)
*C07C 15/08* (2006.01)

(56) References Cited

FOREIGN PATENT DOCUMENTS

| | | |
|---|---|---|
| CN | 102746098 A | 10/2012 |
| CN | 104556108 A | 4/2015 |
| CN | 104557419 A | 4/2015 |
| CN | 105272798 A | 1/2016 |
| CN | 107840778 A | 3/2018 |
| CN | 108160104 A | 6/2018 |
| CN | 108786904 A | 11/2018 |
| CN | 110496640 A | 11/2019 |
| CN | 111187132 A | 5/2020 |
| CN | 111187134 A | 5/2020 |
| CN | 111187141 A | 5/2020 |
| CN | 111559949 A | 8/2020 |
| JP | H11501286 A | 2/1999 |
| JP | 2011079815 A | 4/2011 |
| JP | 2014510706 A | 5/2014 |
| JP | 2017518994 A | 7/2017 |
| JP | 2019513541 A | 5/2019 |
| JP | 2019205969 A | 12/2019 |
| RU | 2114811 C1 | 7/1998 |
| RU | 2745438 C1 | 3/2021 |
| WO | WO-2018217337 A1 * | 11/2018 ............... C07C 1/20 |
| WO | 2023045070 A1 | 3/2023 |

OTHER PUBLICATIONS

Iman Nezam, et al., Direct aromatization of CO2 via combined CO2 hydrogenation and zeolite-based acid catalysis, Journal of CO2 Utilization, 2021, pp. 1-21, vol. 45.

Yang Wang, et al., Direct and oriented conversion of CO2 into value-added aromatics, Chemistry—A European Journal, 2019, pp. 5149-5153, vol. 25, No. 20.

* cited by examiner

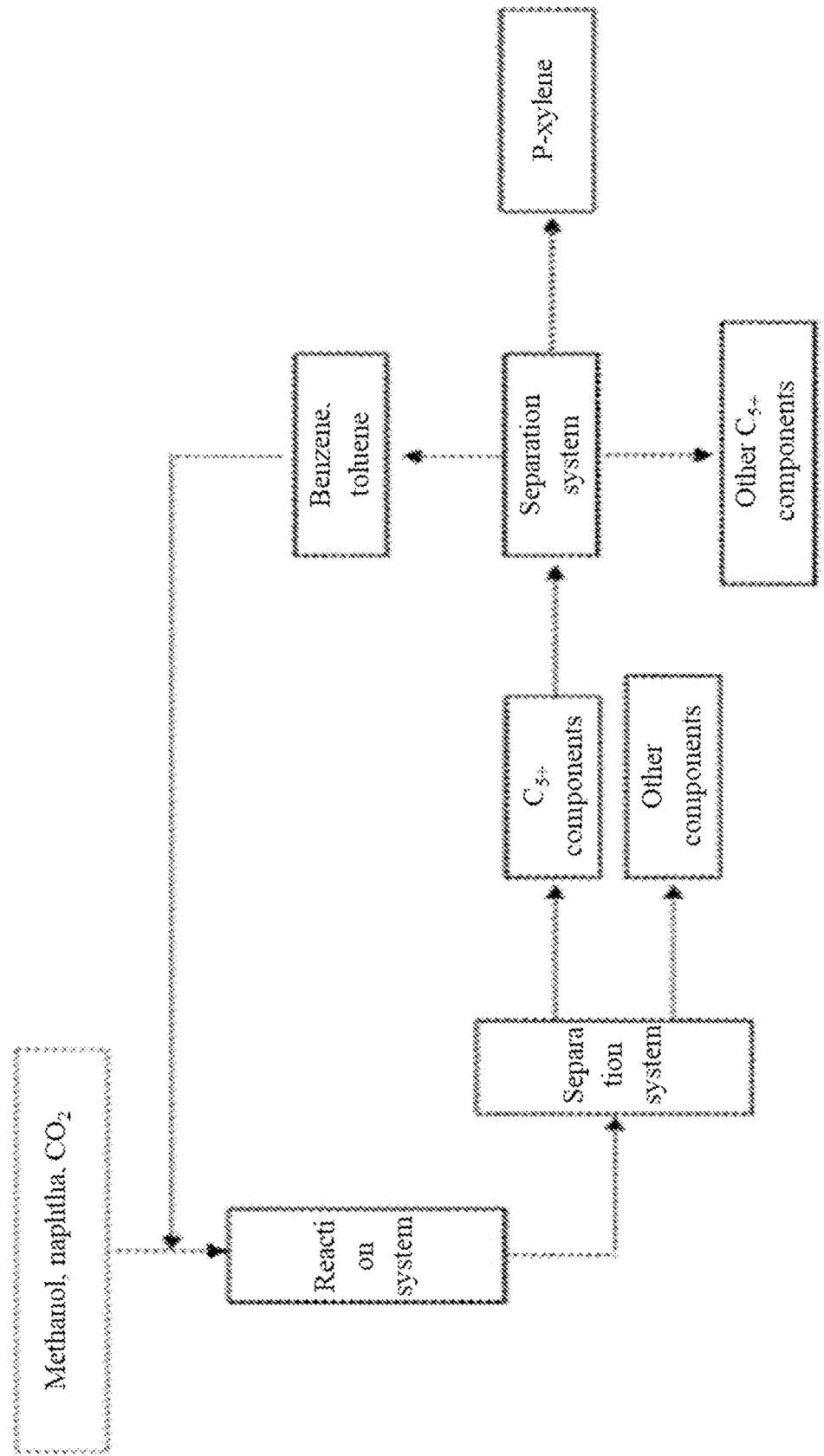

METHOD FOR PREPARING P-XYLENE

CROSS REFERENCE TO THE RELATED APPLICATIONS

This application is the national phase entry of International Application No. PCT/CN2021/137211, filed on Dec. 10, 2021, which is based upon and claims priority to Chinese Patent Application No. 202111122218.0, filed on Sep. 24, 2021, the entire contents of which are incorporated herein by reference.

TECHNICAL FIELD

The present application relates to a method for preparing p-xylene, in particular to a method for preparing p-xylene by coupling conversion of methanol, naphtha and $CO_2$ on a zeolite molecular sieve-based catalyst, and belongs to the field of petrochemical industry.

BACKGROUND

With the development of modern industry, the concentration of carbon dioxide ($CO_2$), as a main greenhouse gas in atmosphere, is constantly increasing, leading to an increasingly prominent greenhouse effect. In 2020, global $CO_2$ emissions have reached 34 billion tons, and the $CO_2$ emissions in China have exceeded 10 billion tons. In 2020, during the 75th session of the United Nations General Assembly, China proposed that the $CO_2$ emissions should reach a peak value before 2030, and efforts should be made to achieve carbon neutrality before 2060. Therefore, recycling, fixation and resource utilization of the $CO_2$ have become a close concern of countries in the world. From the perspective of resources, the $CO_2$ is a cheapest one carbon resource in the world.

Aromatic hydrocarbons represented by three benzene compounds (benzene, toluene and p-xylene) are basic chemical raw materials, in which the p-xylene, as a most concerned product in the aromatic hydrocarbons, has a large market scale and depends on import in large quantities. In 2019, the output of the p-xylene reached 13.46 million tons, the import volume reached 15.94 million tons, and the foreign-trade dependence was 52%. In industry, the p-xylene is mainly produced from naphtha by a catalytic reforming and aromatic hydrocarbon combination device. The technology has many steps, a complicated process and huge investment, and therefore, a large part of aromatic hydrocarbons are obtained by the technology of preparing aromatic hydrocarbons from the naphtha. The aromatic hydrocarbons produced by catalytic reforming of the naphtha account for 80% of the amount of petroleum-based aromatic hydrocarbons. Therefore, rapid development of $CO_2$ utilization technologies, especially conversion of $CO_2$ into aromatic hydrocarbons, has important economic and social significance. On the one hand, the problem of shortage of chemicals in China can be solved. On the other hand, due to a large market scale of aromatic hydrocarbon products, large-scale emission reduction of $CO_2$ can be realized.

CN108160104A discloses a catalyst for hydrogenation of carbon dioxide to produce aromatic hydrocarbons and a preparation method and application thereof. A nano-metal oxide&ZSM-5 molecular sieve catalyst obtained by mechanical mixing, grinding mixing or ball milling is used, the content of $C_{5+}$ components in carbon dioxide hydrogenation products is up to 80%, and the selectivity of aromatic hydrocarbons is 70% or above. CN107840778A discloses a method for preparing aromatic hydrocarbons by hydrogenation of carbon dioxide under the action of a composite catalyst. The composite catalyst is obtained by mixing an iron-based catalyst for hydrogenation of carbon dioxide to produce low carbon olefins as a first component with a metal-modified or unmodified molecular sieve mainly having the effect of aromatization of olefins. Under the action of the composite catalyst, the conversion rate of $CO_2$ is 33%, the selectivity of $C_{5+}$ hydrocarbons can reach 65%, and aromatic hydrocarbons account for 63% of the $C_{5+}$ hydrocarbons. Studies have shown that the $CO_2$ is activated first under the action of a metal oxide, and then intermediate components produced by a reaction with hydrogen undergo carbon chain growth, transfer, ring formation and other processes under the action of a molecular sieve to produce aromatic hydrocarbons. All the above studies indicate that liquid hydrocarbons or aromatic hydrocarbons are produced by hydrogenation of $CO_2$. In addition to technical indicators, sources of hydrogen are also a key problem limiting industrial application.

SUMMARY

The present application provides a new technical route for preparing aromatic hydrocarbons by means of $CO_2$, namely coupling of naphtha as a raw material and $CO_2$ to produce aromatic hydrocarbons, which provides a new way for production of aromatic hydrocarbons and large-scale utilization of $CO_2$.

According to a first aspect of the present application, a method for preparing p-xylene is provided. The method can be used for not only preparing xylene, but also obtaining benzene and toluene, and the benzene and the toluene can be recycled as reaction materials.

A method for preparing p-xylene includes introducing raw materials containing methanol, naphtha and $CO_2$ into a reactor filled with a catalyst for a reaction to produce p-xylene.

Optionally, conditions for the reaction are as follows: the reaction temperature is n a range from 450° C. to 650° C., the reaction pressure is in a range from 0.1 MPa to 3.5 MPa, the weight hourly space velocity of the naphtha is in a range from 0.1 $h^{-1}$ to 5 $h^{-1}$, the weight hourly space velocity of the $CO_2$ is in a range from 0.1 $h^{-1}$ to 3 $h^{-1}$, and the weight hourly space velocity of the methanol is in a range from 0.1 $h^{-1}$ to 5 $h^{-1}$.

Optionally, the conditions for the reaction are as follows: the reaction temperature is in a range from 500° C. to 600° C., the reaction pressure is in a range from 0.1 MPa to 3 MPa, the weight hourly space velocity of the naphtha is in a range from 0.5 $h^{-1}$ to 2 $h^{-1}$, the weight hourly space velocity of the $CO_2$ is in a range from 0.5 $h^{-1}$ to 2 $h^{-1}$, and the weight hourly space velocity of the methanol is in a range from 0.5 $h^{-1}$ to 2 $h^{-1}$.

Optionally, the reaction temperature is 500-600° C., the reaction pressure is 0.1-1 MPa, the weight hourly space velocity of the naphtha is 0.5-2 $h^{-1}$, the weight hourly space velocity of the $CO_2$ is 0.5-2 $h^{-1}$, and the weight hourly space velocity of the methanol is 0.5-2 $h^{-1}$.

Optionally, the reaction temperature is independently selected from any value or a range value determined by any two of 450° C., 480° C., 500° C., 520° C., 550° C., 570° C., 600° C., 620° C. and 650° C.

Optionally, the reaction pressure is independently selected from any value or a range value determined by any two of 0.1 MPa, 0.15 MPa, 0.2 MPa, 0.5 MPa, 1.0 MPa, 1.5 MPa, 2.0 MPa, 2.5 MPa and 3 MPa.

Optionally, the weight hourly space velocity of the naphtha is independently selected from any value or a range value determined by any two of 0.1 h$^{-1}$, 0.2 h$^{-1}$, 0.5 h$^{-1}$, 0.7 h$^{-1}$, 1 h$^{-1}$, 1.2 h$^{-1}$, 1.5 h$^{-1}$, 2 h$^{-1}$, 2.5 h$^{-1}$, 3 h$^{-1}$, 3.5 h$^{-1}$, 4 h$^{-1}$, 4.5 h$^{-1}$ and 5 h$^{-1}$.

Optionally, the weight hourly space velocity of the CO$_2$ is independently selected from any value or a range value determined by any two of 0.1 h$^{-1}$, 0.2 h$^{-1}$, 0.5 h$^{-1}$, 0.7 h$^{-1}$, 1 h$^{-1}$, 1.2 h$^{-1}$, 1.5 h$^{-1}$, 2 h$^{-1}$, 2.5 h$^{-1}$ and 3 h$^{-1}$.

Optionally, the weight hourly space velocity of the methanol is independently selected from any value or a range value determined by any two of 0.1 h$^{-1}$, 0.2 h$^{-1}$, 0.5 h$^{-1}$, 0.7 h$^{-1}$, 1 h$^{-1}$, 1.2 h$^{-1}$, 1.5 h$^{-1}$, 2 h$^{-1}$, 2.5 h$^{-1}$, 3 h$^{-1}$, 3.5 h$^{-1}$, 4 h$^{-1}$, 4.5 h$^{-1}$ and 5 h$^{-1}$.

Optionally, the amount ratio of the CO$_2$, the naphtha and the methanol is (0.3-2):1:(0.3-2).

Optionally, the amount ratio of the CO$_2$, the naphtha and the methanol is (0.3-1.5):1:(0.3-1.5).

Optionally, the amount ratio of the CO$_2$, the naphtha and the methanol is (0.5-1.0):1:(0.5-1.0).

Optionally, the amount ratio of the CO$_2$, the naphtha and the methanol is 1:3:2.

Optionally, the amount ratio of the CO$_2$, the naphtha and the methanol is 0.8:1:0.6.

Optionally, the amount ratio of the CO$_2$, the naphtha and the methanol is 0.8:1:1.2.

Optionally, the amount ratio of the CO$_2$, the naphtha and the methanol is 1.5:1:1.5.

Optionally, components containing benzene and toluene in a mixture obtained after the reaction are separated from the obtained mixture, returned to a reaction system and co-fed with the raw materials for a reaction on the catalyst to produce p-xylene.

In the present application, by separating the components containing benzene and toluene from the mixture obtained after the reaction, namely returning the components containing benzene and toluene in by-products to the reaction system, cyclic utilization of the raw materials is realized.

Optionally, the catalyst is an acidic molecular sieve.

Optionally, the acidic molecular sieve is an HZSM-5 zeolite molecular sieve.

Optionally, the HZSM-5 zeolite molecular sieve has a silica-alumina ratio (Si/Al ratio) of 10-50.

Optionally, the HZSM-5 zeolite molecular sieve has a silica-alumina ratio (Si/Al ratio) of 15.

In the present application, the silica-alumina ratio of the HZSM-5 zeolite molecular sieve is not a main factor affecting catalytic activity, and a silica-alumina ratio (Si/Al ratio) commonly used is selected.

Optionally, the HZSM-5 zeolite molecular sieve is a metal-modified HZSM-5 zeolite molecular sieve.

Optionally, a metal used for metal modification is selected from at least one of La, Zn, Ga, Fe, Mo and Cr.

Optionally, the HZSM-5 zeolite molecular sieve is an HZSM-5 zeolite molecular sieve modified by metal modification and silanization reagent modification.

In the present application, the HZSM-5 zeolite molecular sieve modified by metal modification and silanization reagent modification is an HZSM-5 zeolite molecular sieve obtained by carrying out metal modification first and then carrying out silanization reagent modification continuously.

Optionally, a silanization reagent used for the silanization reagent modification is selected from at least one of compounds with the following chemical formula:

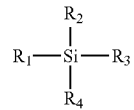

Formula I where R$_1$, R$_2$, R$_3$ and R$_4$ are independently selected from C$_{1-10}$ alkyl and C$_{1-10}$ alkoxyl.

Optionally, at least one of the R$_1$, the R$_2$, the R$_3$ and the R$_4$ is selected from C$_{1-10}$ alkoxyl.

Optionally, the silanization reagent is selected from tetraethyl silicate and/or tetramethyl silicate.

Optionally, before the reaction, the method further includes a step of preparing a catalyst:

placing an HZSM-5 zeolite molecular sieve in a metal salt solution, and carrying out impregnation, drying and calcination to obtain a metal-modified HZSM-5 zeolite molecular sieve.

Optionally, a method for metal modification includes: placing an HZSM-5 zeolite molecular sieve in a metal salt solution, and carrying out impregnation, drying and calcination to obtain a metal-modified HZSM-5 zeolite molecular sieve.

Optionally, conditions for the impregnation are as follows: the impregnation temperature is 60-100° C., and the impregnation time is 2-10 hours.

Optionally, the conditions for the impregnation are as follows: the impregnation temperature is 70-90° C., and the impregnation time is 4-8 hours.

Optionally, the impregnation temperature is independently selected from any value or a range value determined by any two of 60° C., 65° C., 70° C., 75° C., 80° C., 85° C., 90° C., 95° C. and 100° C.

Optionally, the impregnation time is independently selected from any value or a range value determined by any two of 2 h, 3 h, 4 h, 5 h, 6 h, 7 h, 8 h, 9 h and 10 h.

Optionally, the solid-liquid ratio of the HZSM-5 zeolite molecular sieve to the metal salt solution is 1:20 to 1:1.

The solid-liquid ratio refers to the mass ratio.

Optionally, the solid-liquid ratio of the HZSM-5 zeolite molecular sieve to the metal salt solution is 1:10 to 1:1.

Optionally, the solid-liquid ratio of the HZSM-5 zeolite molecular sieve to the metal salt solution is independently selected from any value or a range value determined by any two of 1:10, 1:9, 1:8, 1:7, 1:6, 1:5, 1:4, 1:3, 1:2 and 1:1.

Optionally, the metal salt is a soluble metal salt corresponding to a metal used for metal modification.

In the present application, the soluble metal salt may include nitrate, sulfate and the like corresponding to metals used for metal modification, such as zinc nitrate, gallium nitrate, lanthanum nitrate and chromium nitrate.

Optionally, in the method for metal modification, the drying is carried out in an air atmosphere at 100-150° C.

Optionally, in the method for metal modification, the calcination is carried out in an air atmosphere at 500-700° C.

Optionally, before the reaction, the preparation of a catalyst further includes the following steps: subjecting a material containing a silanization reagent and the metal-modified HZSM-5 zeolite molecular sieve to contact treatment, and carrying out purging with an inert gas, followed by calcination to obtain an HZSM-5 zeolite molecular sieve modified by metal modification and silanization reagent modification.

Optionally, a method for silanization reagent modification includes: subjecting a material containing a silanization reagent and the metal-modified HZSM-5 zeolite molecular sieve to contact treatment, and carrying out purging with an inert gas, followed by calcination to obtain an HZSM-5 zeolite molecular sieve modified by metal modification and silanization reagent modification.

Optionally, the contact treatment is carried out at a temperature of a range from 250° C. to 450° C.

Optionally, the contact treatment is carried out at a temperature of a range from 300° C. to 400° C.

Optionally, the weight hourly space velocity of the silanization reagent is in a range from 0.02 h$^{-1}$ to 0.5 h$^{-1}$.

Optionally, the weight hourly space velocity of the silanization reagent is in a range from 0.05 h$^{-1}$ to 0.4 h$^{-1}$.

Optionally, the contact treatment is carried out at a temperature of 300° C.

Optionally, the weight hourly space velocity of the silanization reagent is 0.2 h$^{-1}$.

Optionally, the inert gas is selected from at least one of nitrogen, helium and argon.

Optionally, the temperature of the contact treatment is independently selected from any value or a range value determined by any two of 250° C., 270° C., 300° C., 320° C., 350° C., 370° C., 400° C., 420° C. and 450° C.

Optionally, the weight hourly space velocity of the silanization reagent is independently selected from any value or a range value determined by any two of 0.02 h$^{-1}$, 0.05 h$^{-1}$, 0.1 h$^{-1}$, 0.15 h$^{-1}$, 0.2 h$^{-1}$, 0.25 h$^{-1}$, 0.3 h$^{-1}$, 0.35 h$^{-1}$, 0.4 h$^{-1}$, 0.45 h$^{-1}$ and 0.5 h$^{-1}$.

Optionally, in the method for silanization reagent modification, the calcination is carried out by introducing air at a temperature of 400-650° C.

Optionally, the reactor is a fixed bed reactor, a fluidized bed reactor or a moving bed reactor.

Optionally, the naphtha is selected from at least one of hydrocracked naphtha, catalytic cracked naphtha, raffinate oil, topped oil and direct coal liquefied naphtha.

Optionally, the carbon number distribution of hydrocarbons in the naphtha is in a range of $C_4$-$C_{12}$.

In another aspect of the present application, a process for preparing p-xylene is also provided. The process includes: feeding raw materials containing naphtha, $CO_2$ and methanol into a reaction system to contact with a catalyst for a reaction to obtain a mixture A, sending the mixture A into a first separation system for separation to obtain $C_{5+}$ components, and sending the $C_{5+}$ components into a second separation system for separation to obtain p-xylene.

Optionally, the $C_{5+}$ components are sent into the second separation system for separation to obtain components containing benzene and toluene, and the components containing benzene and toluene are co-fed into the reaction system with the raw materials containing naphtha, $CO_2$ and methanol.

A method for preparing a catalyst used for preparing p-xylene from raw materials containing methanol, naphtha and $CO_2$ includes:

placing an HZSM-5 zeolite molecular sieve in a metal salt solution, and carrying out impregnation, drying and calcination to obtain a metal-modified HZSM-5 zeolite molecular sieve.

A method for preparing a catalyst used for preparing p-xylene from raw materials containing methanol, naphtha and $CO_2$ includes:

(1) placing an HZSM-5 zeolite molecular sieve in a metal salt solution, and carrying out impregnation, drying and calcination to obtain a metal-modified HZSM-5 zeolite molecular sieve; and (2) subjecting a material containing a silanization reagent and the metal-modified HZSM-5 zeolite molecular sieve to contact treatment, and carrying out purging with an inert gas, followed by calcination to obtain an HZSM-5 zeolite molecular sieve modified by metal modification and silanization reagent modification.

A method for preparing p-xylene includes the following steps:

(S1) preparing a catalyst:
placing an HZSM-5 zeolite molecular sieve in a metal salt solution, and carrying out impregnation, drying and calcination to obtain a metal-modified HZSM-5 zeolite molecular sieve; and (S2) introducing raw materials containing methanol, naphtha and CO2 into a reactor filled with the catalyst prepared in step (S1) for a reaction to produce p-xylene.

Optionally, the step of preparing a catalyst in (S1) further includes:

subjecting a material containing a silanization reagent and the metal-modified HZSM-5 zeolite molecular sieve to contact treatment, and carrying out purging with an inert gas, followed by calcination to obtain an HZSM-5 zeolite molecular sieve modified by metal modification and silanization reagent modification.

Specific preparation conditions are described above.

In the present application, unless otherwise specified, provided data ranges are selected from any values in the ranges and include endpoint values of the ranges.

In the present application, $C_{1-10}$ in the $C_{1-10}$ alkyl and the $C_{1-10}$ alkoxyl means that the total number of carbon atoms in the alkyl and the alkoxyl is 1-10.

The present application has the following beneficial effects.

(1) According to the method for preparing p-xylene by coupling of naphtha and $CO_2$ provided by the present application, by adding the methanol, the product distribution is adjusted, and the selectivity of p-xylene is obviously improved.

(2) According to the method for preparing p-xylene by coupling of naphtha and $CO_2$ provided by the present application, the methanol is added into the raw materials, and the components containing benzene and toluene in the by-products are returned to the reaction system, so that cyclic utilization of the raw materials is achieved, and the method has extremely high economic benefits.

(3) According to the method for preparing p-xylene provided by the present application, the method has a simple process and high feasibility, can greatly improve the selectivity and yield of p-xylene, has an important application value, and provides a new way for large-scale utilization of $CO_2$.

BRIEF DESCRIPTION OF THE DRAWINGS

FIGURE is a schematic diagram of a process flow for preparing p-xylene.

DETAILED DESCRIPTION OF THE EMBODIMENTS

The present application is described in detail below in conjunction with examples, but the present application is not limited to the examples.

Unless otherwise specified, raw materials and catalysts used in the examples of the present application are purchased by commercial ways and used directly without treatment, and instruments and equipment are used in accordance with solutions and parameters recommended by manufacturers.

In the examples, the inner diameter of a fixed bed reactor is 1.5 cm.

A schematic diagram of a process flow of a method for preparing p-xylene provided by the present application is shown in the figure.

As shown in the figure, raw materials containing naphtha, $CO_2$ and methanol are first fed into a reaction system to enable the raw materials containing naphtha, $CO_2$ and methanol to contact with a catalyst in the reaction system for a reaction so as to obtain a mixture A. The mixture A is sent into a first separation system for separation to obtain other components and $C_{5+}$ components. The $C_{5+}$ components are sent into a second separation system for separation to obtain products containing components containing benzene and toluene, p-xylene and other $C_{5+}$ components. The components containing benzene and toluene are pumped back to the reaction system to produce p-xylene, and finally separated to obtain p-xylene.

In the examples of the present application, the type of naphtha is direct coal liquefied naphtha, which includes specific components as shown in the following table. Composition of Direct Coal Liquefied Naphtha

| Carbon number | N-alkanes | Isoalkanes | Cycloalkanes | Aromatic hydrocarbons |
|---|---|---|---|---|
| 6 | 0.03 | 0.00 | 0.00 | 0.00 |
| 7 | 3.76 | 0.71 | 31.85 | 1.60 |
| 8 | 9.36 | 2.62 | 27.53 | 1.94 |
| 9 | 2.03 | 2.44 | 13.88 | 0.40 |
| 10 | 0.15 | 0.75 | 0.74 | 0.07 |
| 11 | 0.01 | 0.03 | 0.10 | 0.00 |
| Total | 15.34 | 6.55 | 74.10 | 4.01 |

Example 1 Preparation of an HZSM-5 Molecular Sieve Molded Sample used in a Fixed Bed 100 g of an HZSM-5 zeolite molecular sieve (Nankai Catalyst Factory, Si/Al=15) was calcined in an air atmosphere at 550° C. for 4 hours, subjected to pressing molding, crushed and sieved to obtain molded molecular sieve particles with a particle size of 40-60 mesh, recorded as FX-HZSM-5.

Example 2 Preparation of a Zinc-Modified HZSM-5 Molecular Sieve Molded Sample used in a Fixed Bed 100 g of an HZSM-5 zeolite molecular sieve (Nankai Catalyst Factory, Si/Al=15) was placed in a 10 wt % zinc nitrate aqueous solution, where the mass ratio (namely solid-liquid ratio) of the HZSM-5 zeolite molecular sieve to the zinc nitrate aqueous solution was 1/10. The molecular sieve was impregnated at 80° C. for 6 hours, drained, dried in an air atmosphere at 120° C. for 4 hours, and then calcined in an air atmosphere at 550° C. for 4 hours to obtain a [Zn]HZSM-5 molecular sieve sample. Then, the sample was subjected to pressing molding, crushed and sieved to obtain molded molecular sieve particles with a particle size of 40-60 mesh, recorded as FX-[Zn]HZSM-5.

Example 3 Preparation of a Gallium-Modified HZSM-5 Molecular Sieve Molded Sample used in a Fixed Bed 100 g of an HZSM-5 zeolite molecular sieve (Nankai Catalyst Factory, Si/Al=15) was placed in a 10 wt % gallium nitrate aqueous solution, where the mass ratio (namely solid-liquid ratio) of the HZSM-5 zeolite molecular sieve to the gallium nitrate aqueous solution was 1/10. The molecular sieve was impregnated at 80° C. for 6 hours, drained, dried in an air atmosphere at 120° C. for 4 hours, and then calcined in an air atmosphere at 550° C. for 4 hours to obtain a [Ga]HZSM-5 molecular sieve sample. Then, the sample was subjected to pressing molding, crushed and sieved to obtain molded molecular sieve particles with a particle size of 40-60 mesh, recorded as FX-[Ga]HZSM-5.

Example 4 Preparation of a Lanthanum-Modified HZSM-5 Molecular Sieve Molded Sample used in a Fixed Bed 100 g of an HZSM-5 zeolite molecular sieve (Nankai Catalyst Factory, Si/Al=15) was placed in a 10 wt % lanthanum nitrate aqueous solution, where the mass ratio (namely solid-liquid ratio) of the HZSM-5 zeolite molecular sieve to the lanthanum nitrate aqueous solution was 1/10. The molecular sieve was impregnated at 90° C. for 4 hours, drained, dried in an air atmosphere at 120° C. for 4 hours, and then calcined in an air atmosphere at 550° C. for 4 hours to obtain a [La]HZSM-5 molecular sieve sample. Then, the sample was subjected to pressing molding, crushed and sieved to obtain molded molecular sieve particles with a particle size of 40-60 mesh, recorded as FX-[La]HZSM-5.

Example 5 Preparation of an Iron-Modified HZSM-5 Molecular Sieve Molded Sample used in a Fixed Bed 100 g of an HZSM-5 zeolite molecular sieve (Nankai Catalyst Factory, Si/Al=15) was placed in a 10 wt % ferric nitrate aqueous solution, where the mass ratio (namely solid-liquid ratio) of the HZSM-5 zeolite molecular sieve to the ferric nitrate aqueous solution was 1/10. The molecular sieve was impregnated at 70° C. for 8 hours, drained, dried in an air atmosphere at 120° C. for 4 hours, and then calcined in an air atmosphere at 550° C. for 4 hours to obtain a [Fe]HZSM-5 molecular sieve sample. Then, the sample was subjected to pressing molding, crushed and sieved to obtain molded molecular sieve particles with a particle size of 40-60 mesh, recorded as FX-[Fe]HZSM-5.

Example 6 Preparation of a Chromium-Modified HZSM-5 Molecular Sieve Molded Sample used in a Fixed Bed 100 g of an HZSM-5 zeolite molecular sieve (Nankai Catalyst Factory, Si/Al=15) was placed in a 10 wt % chromium nitrate aqueous solution, where the mass ratio (namely solid-liquid ratio) of the HZSM-5 zeolite molecular sieve to the chromium nitrate aqueous solution was 1/10. The molecular sieve was impregnated at 70° C. for 8 hours, drained, dried in an air atmosphere at 120° C. for 4 hours, and then calcined in an air atmosphere at 550° C. for 4 hours to obtain a [Cr]HZSM-5 molecular sieve sample. Then, the sample was subjected to pressing molding, crushed and sieved to obtain molded molecular sieve particles with a particle size of 40-60 mesh, recorded as FX-[Cr]HZSM-5.

Example 7 Preparation of a Zinc-Modified HZSM-5 Molecular Sieve Molded Sample used in a Fluidized Bed 100 g of the [Zn]HZSM-5 molecular sieve sample prepared in Example 2 was mixed with an amorphous binder containing aluminum or silicon for spray drying and molding. Specific steps are as follows.

The [Zn]HZSM-5 molecular sieve sample, pseudo-boehmite, silica sol, xanthan gum (biological gum) and water were uniformly mixed, followed by beating, milling and defoaming to obtain slurry. The slurry includes the following parts by weight of components:

| | |
|---|---|
| [Zn]HZSM-5 | 35 parts by weight, |
| Al$_2$O$_3$ | 20 parts by weight, |
| SiO$_2$ | 45 parts by weight, |
| H$_2$O | 240 parts by weight, and |
| xanthan gum | 1 part by weight. |

The obtained slurry was subjected to spray drying and molding to obtain a microsphere particle sample with the particle size distribution of 20-100 μm. Then, the microsphere particle sample was calcined in a Muffle furnace at 550° C. for 3 hours to obtain a [Zn]HZSM-5 molded molecular sieve with an abrasion index of 1.2, recorded as FL-[Zn]HZSM-5.

Example 8 Reaction Evaluation of Coupling Conversion of Methanol, Naphtha and CO$_2$ to Produce Aromatic Hydrocarbons Reaction evaluation of coupling conversion of methanol, naphtha and CO$_2$ to produce aromatic hydrocarbons was carried out on a micro-fixed bed reactor. Evaluation conditions are as follows. 5 g of the FX-HZSM-5 catalyst prepared in Example 1 was loaded into a fixed bed reactor, and treated with nitrogen at 50 ml/min at 550° C. for 1 hour. Then, methanol, naphtha and CO$_2$ were co-fed. The raw materials, methanol and naphtha, were fed by a micro-feed pump, and the flow of the CO$_2$ was controlled by a mass flow meter. The mass ratio of the raw material CO$_2$, the naphtha and the methanol was 1:3:2, the weight hourly space velocity of the naphtha was 1.0 h$^{-1}$, the weight hourly space velocity of the CO$_2$ was 0.33 h$^{-1}$, the weight hourly space velocity of the methanol was 0.67 h$^{-1}$, and the reaction pressure was 1 MPa. Reaction products were analyzed by on-line Agilent7890 gas chromatography, and sampling was carried out for analysis when a reaction was carried out for 30 minutes. Reaction results are shown in Table 1.

TABLE 1

| Reaction evaluation results of a catalyst in Example 8 | |
|---|---|
| Conversion rate of naphtha (wt %) | 89.27 |
| Conversion rate of CO$_2$ (wt %) | 33.24 |
| Conversion rate of methanol (wt %) | 100.00 |
| Selectivity of aromatic hydrocarbons in hydrocarbon products (wt %) | 68.05 |
| Selectivity of PX in hydrocarbon products (wt %) | 2.97 |
| Selectivity of PX in xylene products (wt %) | 24.79 |

TABLE 1-continued

| Reaction evaluation results of a catalyst in Example 8 | |
|---|---|
| Composition of hydrocarbon products (wt %) | |
| Methane | 4.37 |
| Ethylene | 3.96 |
| Ethane | 8.41 |
| Propylene | 2.96 |
| Propane | 7.92 |
| C$_4$ | 4.33 |
| Benzene | 19.51 |
| Toluene | 26.88 |
| Ethylbenzene | 0.81 |
| P-xylene | 2.97 |
| M-xylene | 6.19 |
| O-xylene | 2.82 |
| C$_{8+}$ aromatic hydrocarbons | 8.87 |

Example 9 Reaction Evaluation of Coupling Conversion of Methanol, Naphtha and CO$_2$ to Produce Aromatic Hydrocarbons Reaction evaluation of coupling conversion of methanol, naphtha and CO$_2$ to produce aromatic hydrocarbons was carried out on a micro-fixed bed reactor. Evaluation conditions are as follows. 5 g of the FX-[Zn]HZSM-5 catalyst prepared in Example 2 was loaded into a fixed bed reactor, and treated with nitrogen at 50 ml/min at 550° C. for 1 hour. Then, methanol, naphtha and CO$_2$ were co-fed. The raw materials, methanol and naphtha, were fed by a micro-feed pump, and the flow of the CO$_2$ was controlled by a mass flow meter. The mass ratio of the raw material CO$_2$, the naphtha and the methanol was 0.8:1:0.6, the weight hourly space velocity of the naphtha was 1.0 h$^{-1}$, the weight hourly space velocity of the CO$_2$ was 0.8 h$^{-1}$, the weight hourly space velocity of the methanol was 0.6 h$^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 2.

TABLE 2

| Reaction evaluation results of a catalyst in Example 9 | |
|---|---|
| Conversion rate of naphtha (wt %) | 92.37 |
| Conversion rate of CO$_2$ (wt %) | 38.21 |
| Conversion rate of methanol (wt %) | 100.00 |
| Selectivity of aromatic hydrocarbons in hydrocarbon products (wt %) | 77.08 |
| Selectivity of PX in hydrocarbon products (wt %) | 6.98 |
| Selectivity of PX in xylene products (wt %) | 23.99 |
| Composition of hydrocarbon products (wt %) | |
| Methane | 4.17 |
| Ethylene | 2.91 |
| Ethane | 6.05 |
| Propylene | 2.69 |
| Propane | 6.14 |
| C$_4$ | 0.96 |
| Benzene | 10.87 |
| Toluene | 27.51 |
| Ethylbenzene | 0.56 |
| P-xylene | 6.98 |
| M-xylene | 15.88 |
| O-xylene | 6.23 |
| C$_{8+}$ aromatic hydrocarbons | 9.05 |

Example 10 Preparation of a Catalyst used for Coupling Conversion of Methanol, Naphtha and CO$_2$ to Produce Benzene, Toluene and P-Xylene and Reaction Evaluation A catalyst used for coupling conversion of naphtha and CO$_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 h$^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and CO$_2$ to produce benzene, toluene and p-xylene, named as FXNCC-1.

Then, the temperature was adjusted to a reaction temperature of 550° C. in a nitrogen atmosphere. Raw materials, methanol and naphtha, were fed by a micro-feed pump, and the flow of CO$_2$ was controlled by a mass flow meter. The mass ratio of the raw material CO$_2$, the naphtha and the methanol was 0.8:1:0.6, the weight hourly space velocity of the naphtha was 1.0 h$^{-1}$, the weight hourly space velocity of the CO$_2$ was 0.8 h$^{-1}$, the weight hourly space velocity of the methanol was 0.6 h$^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 3.

TABLE 3

Reaction evaluation results of a catalyst in Example 10

| | |
|---|---|
| Conversion rate of naphtha (wt %) | 92.23 |
| Conversion rate of CO$_2$ (wt %) | 27.29 |
| Conversion rate of methanol (wt %) | 100.00 |
| Selectivity of ethylene and propylene in hydrocarbon products (wt %) | 8.50 |
| Selectivity of BTX in hydrocarbon products (wt %) | 71.95 |
| Selectivity of aromatic hydrocarbons in hydrocarbon products (wt %) | 77.17 |
| Selectivity of PX in hydrocarbon products (wt %) | 32.53 |
| Selectivity of PX in xylene products (wt %) | 95.84 |
| Composition of hydrocarbon products (wt %) | |
| Methane | 1.89 |
| Ethylene | 3.19 |
| Ethane | 2.95 |
| Propylene | 5.31 |
| Propane | 4.07 |
| C$_4$ | 5.43 |
| Benzene | 7.69 |
| Toluene | 30.31 |
| Ethylbenzene | 1.38 |
| P-xylene | 32.53 |
| M-xylene | 0.96 |
| O-xylene | 0.45 |
| C$_{8+}$ aromatic hydrocarbons | 3.84 |

Example 11 Preparation of a Catalyst used for Coupling Conversion Of Methanol, Naphtha and CO$_2$ to Produce P-Xylene and Reaction Evaluation With same operations as that in Example 10, a fixed bed catalyst used for coupling conversion of naphtha and CO$_2$ to produce benzene, toluene and p-xylene was prepared, named as FXNCC-1.

Then, the temperature was adjusted to a reaction temperature of 550° C. in a nitrogen atmosphere. Raw materials, methanol and naphtha, were fed by a micro-feed pump, and the flow of CO$_2$ was controlled by a mass flow meter. The mass ratio of the raw material CO$_2$, the naphtha and the methanol was 0.8:1:0.6, the weight hourly space velocity of the naphtha was 1.0 h$^{-1}$, the weight hourly space velocity of the CO$_2$ was 0.8 h$^{-1}$, the weight hourly space velocity of the methanol was 0.6 h$^{-1}$, and the reaction pressure was 0.1 MPa. According to Example 10, components containing benzene and toluene in reaction products of the methanol, the naphtha and the CO$_2$ were prepared into raw materials, and then fed by a micro-feed pump (equivalent to the operations that benzene and toluene were separated from reaction products of the methanol, the naphtha and the CO$_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 4.

TABLE 4

Reaction evaluation results of a catalyst in Example 11

| | |
|---|---|
| Conversion rate of naphtha (wt %) | 91.27 |
| Conversion rate of CO$_2$ (wt %) | 24.13 |
| Conversion rate of methanol (wt %) | 100.00 |
| Selectivity of ethylene and propylene in hydrocarbon products (wt %) | 10.94 |
| Selectivity of PX in hydrocarbon products (wt %) | 63.03 |
| Selectivity of PX in xylene products (wt %) | 96.17 |
| Composition of hydrocarbon products (wt %) | |
| Methane | 2.18 |
| Ethylene | 5.21 |
| Ethane | 3.08 |
| Propylene | 5.73 |
| Propane | 3.83 |
| C$_4$ | 7.00 |
| Ethylbenzene | 2.13 |
| P-xylene | 63.03 |
| M-xylene | 1.68 |
| O-xylene | 0.83 |
| C$_{8+}$ aromatic hydrocarbons | 5.30 |

Example 12 Preparation of a Catalyst used for Coupling Conversion of Methanol, Naphtha and CO$_2$ to Produce Benzene, Toluene and P-Xylene and Reaction Evaluation A catalyst used for coupling conversion of naphtha and CO$_2$ to produce benzene, toluene and p-xylene was prepared on-line in a micro-fixed bed reactor. Conditions for on-line preparation of the catalyst are as follows. 5 g of the FX-[Ga]HZSM-5 catalyst prepared in Example 3 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 h$^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and CO$_2$ to produce benzene, toluene and p-xylene, named as FXNCC-2.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 5.

TABLE 5

Reaction evaluation results of a catalyst in Example 12

| | |
|---|---|
| Conversion rate of naphtha (wt %) | 89.96 |
| Conversion rate of $CO_2$ (wt %) | 24.09 |
| Conversion rate of methanol (wt %) | 100.00 |
| Selectivity of ethylene and propylene in hydrocarbon products (wt %) | 8.98 |
| Selectivity of BTX in hydrocarbon products (wt %) | 72.39 |
| Selectivity of aromatic hydrocarbons in hydrocarbon products (wt %) | 77.15 |
| Selectivity of PX in hydrocarbon products (wt %) | 34.30 |
| Selectivity of PX in xylene products (wt %) | 96.10 |
| Composition of hydrocarbon products (wt %) | |
| Methane | 1.43 |
| Ethylene | 3.89 |
| Ethane | 2.83 |
| Propylene | 5.09 |
| Propane | 3.92 |
| $C_4$ | 5.70 |
| Benzene | 7.27 |
| Toluene | 29.42 |
| Ethylbenzene | 1.25 |
| P-xylene | 34.30 |
| M-xylene | 0.93 |
| O-xylene | 0.46 |
| $C_{8+}$ aromatic hydrocarbons | 3.51 |

Example 13 Preparation of a Catalyst used for Coupling Conversion of Methanol, Naphtha and $CO_2$ to Produce P-Xylene and Reaction Evaluation With same operations as that in Example 12, a fixed bed catalyst used for coupling conversion of naphtha and $CO_2$ to produce benzene, toluene and p-xylene was prepared, named as FXNCC-2.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. According to Example 12, components containing benzene and toluene in reaction products of the methanol, the naphtha and the $CO_2$ were prepared into raw materials, and then fed by a micro-feed pump (equivalent to the operations that benzene and toluene were separated from reaction products of the methanol, the naphtha and the $CO_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 6.

TABLE 6

Reaction evaluation results of a catalyst in Example 13

| | |
|---|---|
| Conversion rate of naphtha (wt %) | 85.78 |
| Conversion rate of $CO_2$ (wt %) | 22.01 |
| Conversion rate of methanol (wt %) | 100.00 |
| Selectivity of ethylene and propylene in hydrocarbon products (wt %) | 13.77 |
| Selectivity of PX in hydrocarbon products (wt %) | 60.41 |
| Selectivity of PX in xylene products (wt %) | 95.91 |
| Composition of hydrocarbon products (wt %) | |
| Methane | 1.97 |
| Ethylene | 6.63 |
| Ethane | 3.15 |
| Propylene | 7.16 |
| Propane | 3.62 |
| $C_4$ | 7.68 |
| Ethylbenzene | 1.67 |
| P-xylene | 60.41 |
| M-xylene | 1.79 |
| O-xylene | 0.78 |
| $C_{8+}$ aromatic hydrocarbons | 5.14 |

Example 14 Preparation of a Catalyst used for Coupling Conversion of Methanol, Naphtha and $CO_2$ to Produce P-Xylene and Reaction Evaluation A catalyst used for coupling conversion of naphtha and $CO_2$ to produce p-xylene was prepared on-line in a micro-fixed bed reactor. Conditions for on-line preparation of the catalyst are as follows. 5 g of the FX-[La]HZSM-5 catalyst prepared in Example 4 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce p-xylene, named as FXNCC-3.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 7.

TABLE 7

Reaction evaluation results of a catalyst in Example 14

| | |
|---|---|
| Conversion rate of naphtha (wt %) | 85.07 |
| Conversion rate of $CO_2$ (wt %) | 20.11 |
| Conversion rate of methanol (wt %) | 100.00 |
| Selectivity of ethylene and propylene in hydrocarbon products (wt %) | 10.01 |
| Selectivity of BTX in hydrocarbon products (wt %) | 70.08 |
| Selectivity of aromatic hydrocarbons in hydrocarbon products (wt %) | 74.63 |

TABLE 7-continued

Reaction evaluation results of a catalyst in Example 14

| | |
|---|---|
| Selectivity of PX in hydrocarbon products (wt %) | 31.02 |
| Selectivity of PX in xylene products (wt %) | 95.88 |
| Composition of hydrocarbon products (wt %) | |
| Methane | 2.92 |
| Ethylene | 4.57 |
| Ethane | 3.43 |
| Propylene | 5.44 |
| Propane | 3.55 |
| $C_4$ | 5.45 |
| Benzene | 9.33 |
| Toluene | 28.40 |
| Ethylbenzene | 1.20 |
| P-xylene | 31.02 |
| M-xylene | 0.89 |
| O-xylene | 0.44 |
| $C_{8+}$ aromatic hydrocarbons | 3.36 |

Example 15 Preparation of a Catalyst used for Coupling Conversion of Methanol, Naphtha and $CO_2$ to Produce P-Xylene and Reaction Evaluation With same operations as that in Example 14, a fixed bed catalyst used for coupling conversion of naphtha and $CO_2$ to produce p-xylene was prepared, named as FXNCC-3.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. According to Example 14, components containing benzene and toluene in reaction products of the methanol, the naphtha and the $CO_2$ were prepared into raw materials, and then fed by a micro-feed pump (equivalent to the operations that benzene and toluene were separated from reaction products of the methanol, the naphtha and the $CO_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 8.

TABLE 8

Reaction evaluation results of a catalyst in Example 15

| | |
|---|---|
| Conversion rate of naphtha (wt %) | 83.16 |
| Conversion rate of $CO_2$ (wt %) | 18.11 |
| Conversion rate of methanol (wt %) | 100.00 |
| Selectivity of ethylene and propylene in hydrocarbon products (wt %) | 14.14 |
| Selectivity of PX in hydrocarbon products (wt %) | 60.20 |
| Selectivity of PX in xylene products (wt %) | 96.11 |
| Composition of hydrocarbon products (wt %) | |
| Methane | 2.85 |
| Ethylene | 6.78 |
| Ethane | 2.66 |
| Propylene | 7.36 |
| Propane | 4.01 |
| $C_4$ | 6.72 |
| Ethylbenzene | 1.71 |
| P-xylene | 60.20 |

TABLE 8-continued

Reaction evaluation results of a catalyst in Example 15

| | |
|---|---|
| M-xylene | 1.62 |
| O-xylene | 0.81 |
| $C_{8+}$ aromatic hydrocarbons | 5.28 |

Example 16 Preparation of a Catalyst used for Coupling Conversion of Methanol, Naphtha and $CO_2$ to Produce P-Xylene and Reaction Evaluation A catalyst used for coupling conversion of naphtha and $CO_2$ to produce p-xylene was prepared on-line in a micro-fixed bed reactor. Conditions for on-line preparation of the catalyst are as follows. 5 g of the FX-[Fe]HZSM-5 catalyst prepared in Example 5 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce p-xylene, named as FXNCC-4.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 9.

TABLE 9

Reaction evaluation results of a catalyst in Example 16

| | |
|---|---|
| Conversion rate of naphtha (wt %) | 81.29 |
| Conversion rate of $CO_2$ (wt %) | 22.23 |
| Conversion rate of methanol (wt %) | 100.00 |
| Selectivity of ethylene and propylene in hydrocarbon products (wt %) | 13.78 |
| Selectivity of BTX in hydrocarbon products (wt %) | 67.52 |
| Selectivity of aromatic hydrocarbons in hydrocarbon products (wt %) | 71.40 |
| Selectivity of PX in hydrocarbon products (wt %) | 26.45 |
| Selectivity of PX in xylene products (wt %) | 96.37 |
| Composition of hydrocarbon products (wt %) | |
| Methane | 1.99 |
| Ethylene | 5.40 |
| Ethane | 2.40 |
| Propylene | 8.38 |
| Propane | 3.22 |
| $C_4$ | 7.21 |
| Benzene | 10.53 |
| Toluene | 29.54 |
| Ethylbenzene | 1.08 |
| P-xylene | 26.45 |
| M-xylene | 0.70 |
| O-xylene | 0.30 |
| $C_{8+}$ aromatic hydrocarbons | 2.80 |

Example 17 Preparation of a Catalyst used for Coupling Conversion of Methanol, Naphtha and $CO_2$ to Produce P-Xylene and Reaction Evaluation With same operations as that in Example 16, a fixed bed catalyst used for coupling conversion of naphtha and $CO_2$ to produce p-xylene was prepared, named as FXNCC-4.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. According to Example 16, components containing benzene and toluene in reaction products of the methanol, the naphtha and the $CO_2$ were prepared into raw materials, and then fed by a micro-feed pump (equivalent to the operations that benzene and toluene were separated from reaction products of the methanol, the naphtha and the $CO_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 10.

TABLE 10

| Reaction evaluation results of a catalyst in Example 17 | |
|---|---|
| Conversion rate of naphtha (wt %) | 79.13 |
| Conversion rate of $CO_2$ | 20.06 |
| Conversion rate of methanol (wt %) | 100.00 |
| Selectivity of ethylene and propylene in hydrocarbon products (wt %) | 18.41 |
| Selectivity of PX in hydrocarbon products (wt %) | 55.45 |
| Selectivity of PX in xylene products (wt %) | 95.84 |
| Composition of hydrocarbon products (wt %) | |
| Methane | 2.12 |
| Ethylene | 7.24 |
| Ethane | 2.58 |
| Propylene | 11.17 |
| Propane | 3.68 |
| $C_4$ | 8.55 |
| Ethylbenzene | 1.94 |
| P-xylene | 55.45 |
| M-xylene | 1.58 |
| O-xylene | 0.83 |
| $C_{8+}$ aromatic hydrocarbons | 4.86 |

Example 18 Preparation of a Catalyst used for Coupling Conversion of Methanol, Naphtha and $CO_2$ to Produce P-Xylene and Reaction Evaluation A catalyst used for coupling conversion of naphtha and $CO_2$ to produce p-xylene was prepared on-line in a micro-fixed bed reactor. Conditions for on-line preparation of the catalyst are as follows. 5 g of the FX-[Cr]HZSM-5 catalyst prepared in Example 6 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce p-xylene, named as FXNCC-5.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 11.

TABLE 11

| Reaction evaluation results of a catalyst in Example 18 | |
|---|---|
| Conversion rate of naphtha (wt %) | 83.78 |
| Conversion rate of $CO_2$ (wt %) | 23.01 |
| Conversion rate of methanol (wt %) | 100.00 |
| Selectivity of ethylene and propylene in hydrocarbon products (wt %) | 9.36 |
| Selectivity of BTX in hydrocarbon products (wt %) | 66.81 |
| Selectivity of aromatic hydrocarbons in hydrocarbon products (wt %) | 70.83 |
| Selectivity of PX in hydrocarbon products (wt %) | 26.16 |
| Selectivity of PX in xylene products (wt %) | 96.26 |
| Composition of hydrocarbon products (wt %) | |
| Methane | 2.87 |
| Ethylene | 3.91 |
| Ethane | 4.16 |
| Propylene | 5.45 |
| Propane | 4.77 |
| $C_4$ | 8.02 |
| Benzene | 10.41 |
| Toluene | 29.21 |
| Ethylbenzene | 1.07 |
| P-xylene | 26.16 |
| M-xylene | 0.70 |
| O-xylene | 0.32 |
| $C_{8+}$ aromatic hydrocarbons | 2.95 |

Example 19 Preparation of a Catalyst used for Coupling Conversion of Methanol, Naphtha and $CO_2$ to Produce P-Xylene and Reaction Evaluation With same operations as that in Example 18, a fixed bed catalyst used for coupling conversion of naphtha and $CO_2$ to produce p-xylene was prepared, named as FXNCC-5.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. According to Example 18, components containing benzene and toluene in reaction products of the methanol, the naphtha and the $CO_2$ were prepared into raw materials, and then fed by a micro-feed pump (equivalent to the operations that benzene and toluene were separated from reaction products of the methanol, the naphtha and the $CO_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 12.

TABLE 12

| Reaction evaluation results of a catalyst in Example 19 | |
|---|---|
| Conversion rate of naphtha (wt %) | 80.08 |
| Conversion rate of $CO_2$ (wt %) | 21.77 |
| Conversion rate of methanol (wt %) | 100.00 |
| Selectivity of ethylene and propylene in hydrocarbon products (wt %) | 13.47 |
| Selectivity of PX in hydrocarbon products (wt %) | 55.41 |
| Selectivity of PX in xylene products (wt %) | 95.52 |
| Composition of hydrocarbon products (wt %) | |
| Methane | 2.86 |
| Ethylene | 5.79 |
| Ethane | 4.36 |
| Propylene | 7.69 |
| Propane | 5.08 |
| $C_4$ | 9.78 |
| Ethylbenzene | 1.32 |
| P-xylene | 55.41 |
| M-xylene | 1.68 |
| O-xylene | 0.92 |
| $C_{8+}$ aromatic hydrocarbons | 5.11 |

Example 20 Preparation of a Catalyst used for Coupling Conversion of Methanol, Naphtha and $CO_2$ to Produce P-Xylene and Reaction Evaluation A catalyst used for coupling conversion of naphtha and $CO_2$ to produce p-xylene was prepared on-line in a micro-fixed fluidized bed reactor. Conditions for on-line preparation of the catalyst are as follows. 10 g of the FX-[Zn]HZSM-5 catalyst prepared in Example 7 was loaded into a fixed fluidized bed reactor, treated with nitrogen at 50 ml/min at 550° C. for 1 hour, and then cooled to 300° C. in a nitrogen atmosphere. In the nitrogen atmosphere (controlled by a mass flow meter, 200 ml/min), tetraethyl silicate was pumped into the reactor at a weight hourly space velocity of 0.2 $h^{-1}$ at normal pressure. After feeding for 75 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce p-xylene, named as FLNCC-1.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 13.

TABLE 13

| Reaction evaluation results of a catalyst in Example 20 | |
|---|---|
| Conversion rate of naphtha (wt %) | 86.35 |
| Conversion rate of $CO_2$ (wt %) | 23.66 |
| Conversion rate of methanol (wt %) | 100.00 |

TABLE 13-continued

| Reaction evaluation results of a catalyst in Example 20 | |
|---|---|
| Selectivity of ethylene and propylene in hydrocarbon products (wt %) | 6.14 |
| Selectivity of BTX in hydrocarbon products (wt %) | 68.53 |
| Selectivity of aromatic hydrocarbons in hydrocarbon products (wt %) | 73.87 |
| Selectivity of PX in hydrocarbon products (wt %) | 30.21 |
| Selectivity of PX in xylene products (wt %) | 96.30 |
| Composition of hydrocarbon products (wt %) | |
| Methane | 2.96 |
| Ethylene | 1.03 |
| Ethane | 3.89 |
| Propylene | 5.12 |
| Propane | 5.01 |
| $C_4$ | 8.13 |
| Benzene | 7.88 |
| Toluene | 29.27 |
| Ethylbenzene | 1.11 |
| P-xylene | 30.21 |
| M-xylene | 0.78 |
| O-xylene | 0.38 |
| $C_{8+}$ aromatic hydrocarbons | 4.23 |

Example 21 Preparation of a Catalyst used for Coupling Conversion of Methanol, Naphtha and $CO_2$ to Produce P-Xylene and Reaction Evaluation With same operations as that in Example 20, a fixed bed catalyst used for coupling conversion of naphtha and $CO_2$ to produce p-xylene was prepared, named as FLNCC-1.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. According to Example 20, components containing benzene and toluene in reaction products of the methanol, the naphtha and the $CO_2$ were prepared into raw materials, and then fed by a micro-feed pump (equivalent to the operations that benzene and toluene were separated from reaction products of the methanol, the naphtha and the $CO_2$, and then pumped back to a fixed bed reactor by a micro-feed pump). Reaction products were analyzed by on-line Agilent7890 gas chromatography, and sampling was carried out for analysis when a reaction was carried out for 30 minutes. Reaction results are shown in Table 14.

TABLE 14

| Reaction evaluation results of a catalyst in Example 21 | |
|---|---|
| Conversion rate of naphtha (wt %) | 83.26 |
| Conversion rate of $CO_2$ (wt %) | 20.95 |
| Conversion rate of methanol (wt %) | 100.00 |
| Selectivity of ethylene and propylene in hydrocarbon products (wt %) | 7.86 |
| Selectivity of PX in hydrocarbon products (wt %) | 59.94 |
| Selectivity of PX in xylene products (wt %) | 96.06 |
| Composition of hydrocarbon products (wt %) | |
| Methane | 2.16 |
| Ethylene | 1.98 |
| Ethane | 4.01 |
| Propylene | 5.88 |
| Propane | 5.71 |
| $C_4$ | 10.43 |

TABLE 14-continued

| Reaction evaluation results of a catalyst in Example 21 | |
| --- | --- |
| Ethylbenzene | 1.34 |
| P-xylene | 59.94 |
| M-xylene | 1.63 |
| O-xylene | 0.83 |
| $C_{8+}$ aromatic hydrocarbons | 6.09 |

Comparative Example 1 Preparation of a Catalyst used for Coupling Conversion of Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-1.

Then, the temperature was adjusted to a reaction temperature of 550° C. in a nitrogen atmosphere. A raw material, naphtha, was fed by a micro-feed pump, and the flow of $CO_2$ was controlled by a mass flow meter. The mass ratio of the raw material $CO_2$ to the naphtha was 0.8:1, the weight hourly space velocity of the naphtha was 1.0 $h^{-1}$, the weight hourly space velocity of the $CO_2$ was 0.8 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 15.

TABLE 15

| Evaluation of reaction performance of a catalyst in Comparative Example 1 | |
| --- | --- |
| Conversion rate of naphtha (wt %) | 80.12 |
| Conversion rate of $CO_2$ (wt %) | 31.13 |
| Selectivity of ethylene and propylene in hydrocarbon products (wt %) | 12.61 |
| Selectivity of benzene, toluene and PX in hydrocarbon products (wt %) | 69.06 |
| Selectivity of aromatic hydrocarbons in hydrocarbon products (wt %) | 73.73 |
| Selectivity of PX in hydrocarbon products (wt %) | 12.31 |
| Selectivity of PX in xylene products (wt %) | 95.50 |
| Composition of hydrocarbon products (wt %) | |
| Methane | 2.29 |
| Ethylene | 5.4 |
| Ethane | 2.93 |
| Propylene | 7.21 |
| Propane | 3.26 |
| $C_4$ | 5.18 |
| Benzene | 19.3 |
| Toluene | 37.45 |
| Ethylbenzene | 1.34 |
| P-xylene | 12.31 |

TABLE 15-continued

| Evaluation of reaction performance of a catalyst in Comparative Example 1 | |
| --- | --- |
| M-xylene | 0.39 |
| O-xylene | 0.19 |
| $C_{8+}$ aromatic hydrocarbons | 2.75 |

As can be seen, the content of p-xylene in composition of hydrocarbon products is 12.31% when methanol is not contained in the raw materials, and compared with Example 10, the content of p-xylene is increased to 32.53% due to the addition of methanol. Therefore, the addition of methanol greatly improves the selectivity of p-xylene.

Example 22 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-1.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:1.2, the weight hourly space velocity of the naphtha was 1.0 $h^{-1}$, the weight hourly space velocity of the $CO_2$ was 0.8 $h^{-1}$, the weight hourly space velocity of the methanol was 1.2 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 16.

TABLE 16

| Reaction evaluation results of a catalyst in Example 22 | |
| --- | --- |
| Conversion rate of naphtha (wt %) | 90.19 |
| Conversion rate of $CO_2$ (wt %) | 25.87 |
| Conversion rate of methanol (wt %) | 100.00 |
| Selectivity of ethylene and propylene in hydrocarbon products (wt %) | 6.58 |
| Selectivity of BTX in hydrocarbon products (wt %) | 69.37 |
| Selectivity of aromatic hydrocarbons in hydrocarbon products (wt %) | 77.43 |
| Selectivity of PX in hydrocarbon products (wt %) | 44.36 |
| Selectivity of PX in xylene products (wt %) | 96.04 |
| Composition of hydrocarbon products (wt %) | |
| Methane | 1.96 |
| Ethylene | 2.35 |
| Ethane | 3.76 |

TABLE 16-continued

Reaction evaluation results of a catalyst in Example 22

| | |
|---|---|
| Propylene | 4.23 |
| Propane | 5.31 |
| $C_4$ | 4.96 |
| Benzene | 4.32 |
| Toluene | 20.69 |
| Ethylbenzene | 1.26 |
| P-xylene | 44.36 |
| M-xylene | 1.18 |
| O-xylene | 0.65 |
| $C_{8+}$ aromatic hydrocarbons | 4.97 |

As can be seen, compared with Example 10, the content of p-xylene in composition of hydrocarbon products is increased from 32.53% to 44.36% when the added amount of methanol is increased. The results further indicate that the addition of methanol improves the selectivity of p-xylene.

Example 23 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 400° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-6.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 17.

TABLE 17

Reaction evaluation results of a catalyst in Example 23

| | |
|---|---|
| Conversion rate of naphtha (wt %) | 90.03 |
| Conversion rate of $CO_2$ (wt %) | 25.21 |
| Conversion rate of methanol (wt %) | 100.00 |
| Selectivity of ethylene and propylene in hydrocarbon products (wt %) | 7.76 |
| Selectivity of BTX in hydrocarbon products (wt %) | 72.28 |
| Selectivity of aromatic hydrocarbons in hydrocarbon products (wt %) | 76.27 |

TABLE 17-continued

Reaction evaluation results of a catalyst in Example 23

| | |
|---|---|
| Selectivity of PX in hydrocarbon products (wt %) | 32.44 |
| Selectivity of PX in xylene products (wt %) | 96.85 |
| Composition of hydrocarbon products (wt %) | |
| Methane | 2.11 |
| Ethylene | 3.03 |
| Ethane | 3.17 |
| Propylene | 4.73 |
| Propane | 5.15 |
| $C_4$ | 5.55 |
| Benzene | 8.42 |
| Toluene | 30.36 |
| Ethylbenzene | 0.98 |
| P-xylene | 32.44 |
| M-xylene | 0.69 |
| O-xylene | 0.37 |
| $C_{8+}$ aromatic hydrocarbons | 3.00 |

Example 24 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.4 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-7.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 18.

TABLE 18

Reaction evaluation results of a catalyst in Example 24

| | |
|---|---|
| Conversion rate of naphtha (wt %) | 81.35 |
| Conversion rate of $CO_2$ (wt %) | 23.65 |
| Conversion rate of methanol (wt %) | 100.00 |
| Selectivity of ethylene and propylene in hydrocarbon products (wt %) | 8.08 |
| Selectivity of BTX in hydrocarbon products (wt %) | 70.43 |
| Selectivity of aromatic hydrocarbons in hydrocarbon products (wt %) | 73.66 |
| Selectivity of PX in hydrocarbon products (wt %) | 32.69 |
| Selectivity of PX in xylene products (wt %) | 98.02 |

TABLE 18-continued

Reaction evaluation results of a catalyst in Example 24

Composition of hydrocarbon products (wt %)

| | |
|---|---|
| Methane | 3.79 |
| Ethylene | 4.22 |
| Ethane | 5.36 |
| Propylene | 3.86 |
| Propane | 5.51 |
| $C_4$ | 3.60 |
| Benzene | 7.70 |
| Toluene | 29.37 |
| Ethylbenzene | 0.61 |
| P-xylene | 32.69 |
| M-xylene | 0.43 |
| O-xylene | 0.23 |
| $C_{8+}$ aromatic hydrocarbons | 2.63 |

Example 25 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.05 $h^{-1}$ at normal pressure. After feeding for 240 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-8.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 19.

TABLE 19

Reaction evaluation results of a catalyst in Example 25

| | |
|---|---|
| Conversion rate of naphtha (wt %) | 91.01 |
| Conversion rate of $CO_2$ (wt %) | 26.85 |
| Conversion rate of methanol (wt %) | 100.00 |
| Selectivity of ethylene and propylene in hydrocarbon products (wt %) | 8.01 |
| Selectivity of BTX in hydrocarbon products (wt %) | 71.62 |
| Selectivity of aromatic hydrocarbons in hydrocarbon products (wt %) | 76.20 |
| Selectivity of PX in hydrocarbon products (wt %) | 33.01 |
| Selectivity of PX in xylene products (wt %) | 96.23 |

TABLE 19-continued

Reaction evaluation results of a catalyst in Example 25

Composition of hydrocarbon products (wt %)

| | |
|---|---|
| Methane | 2.12 |
| Ethylene | 3.50 |
| Ethane | 4.50 |
| Propylene | 4.51 |
| Propane | 5.50 |
| $C_4$ | 3.67 |
| Benzene | 8.15 |
| Toluene | 29.17 |
| Ethylbenzene | 0.98 |
| P-xylene | 33.01 |
| M-xylene | 0.86 |
| O-xylene | 0.44 |
| $C_{8+}$ aromatic hydrocarbons | 3.59 |

Example 26 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-1.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 0.8:1:0.6, the weight hourly space velocity of the naphtha was 1.0 $h^{-1}$, the weight hourly space velocity of the $CO_2$ was 0.8 $h^{-1}$, the weight hourly space velocity of the methanol was 0.6 $h^{-1}$, and the reaction pressure was 3 MPa. Reaction products were analyzed by on-line Agilent7890 gas chromatography, and sampling was carried out for analysis when a reaction was carried out for 30 minutes. Reaction results are shown in Table 20.

TABLE 20

Reaction evaluation results of a catalyst in Example 26

| | |
|---|---|
| Conversion rate of naphtha (wt %) | 93.05 |
| Conversion rate of $CO_2$ (wt %) | 30.59 |
| Conversion rate of methanol (wt %) | 100 |
| Selectivity of ethylene and propylene in hydrocarbon products (wt %) | 1.70 |
| Selectivity of BTX in hydrocarbon products (wt %) | 74.72 |
| Selectivity of aromatic hydrocarbons in hydrocarbon products (wt %) | 81.44 |
| Selectivity of PX in hydrocarbon products (wt %) | 30.39 |
| Selectivity of PX in xylene products (wt %) | 86.80 |
| Composition of hydrocarbon products (wt %) | |
| Methane | 3.62 |
| Ethylene | 0.69 |

TABLE 20-continued

Reaction evaluation results of a catalyst in Example 26

| | |
|---|---|
| Ethane | 4.49 |
| Propylene | 1.01 |
| Propane | 5.48 |
| $C_4$ | 3.28 |
| Benzene | 8.81 |
| Toluene | 30.90 |
| Ethylbenzene | 1.05 |
| P-xylene | 30.39 |
| M-xylene | 3.01 |
| O-xylene | 1.61 |
| $C_{8+}$ aromatic hydrocarbons | 5.66 |

Example 27 Preparation of a Catalyst used for Coupling Conversion of Methanol, Naphtha and $CO_2$ to Produce Benzene, Toluene and P-Xylene and Reaction Evaluation A catalyst used for coupling conversion of naphtha and $CO_2$ to produce benzene, toluene and p-xylene was prepared on-line in a micro-fixed bed reactor. Conditions for on-line preparation of the catalyst are as follows. 5 g of the FX-[Zn]HZSM-5 catalyst prepared in Example 2 was loaded into a fixed bed reactor, treated with nitrogen at 50 ml/min at 550° C. for 1 hour, and then cooled to 300° C. in a nitrogen atmosphere. In the nitrogen atmosphere (controlled by a mass flow meter, 100 ml/min), tetraethyl silicate was pumped into the reactor at a weight hourly space velocity of 0.2 $h^{-1}$ at normal pressure. After feeding for 60 minutes, the feeding was stopped. A resulting mixture was purged with nitrogen, heated to 550° C., and then calcined in an air atmosphere for 4 hours to obtain a fixed bed catalyst used for coupling conversion of naphtha and $CO_2$ to produce benzene, toluene and p-xylene, named as FXNCC-1.

Then, the temperature was adjusted to a reaction temperature of 550° C. in a nitrogen atmosphere. Raw materials, methanol and naphtha, were fed by a micro-feed pump, and the flow of $CO_2$ was controlled by a mass flow meter. The mass ratio of the raw material $CO_2$, the naphtha and the methanol was 1.5:1:1.5, the weight hourly space velocity of the naphtha was 1.0 $h^{-1}$, the weight hourly space velocity of the $CO_2$ was 1.5 $h^{-1}$, the weight hourly space velocity of the methanol was 1.5 $h^{-1}$, and the reaction pressure was 0.1 MPa. Reaction products were analyzed by on-line Agilent7890 gas chromatography, and sampling was carried out for analysis when a reaction was carried out for 30 minutes. Reaction results are shown in Table 21.

TABLE 21

Reaction evaluation results of a catalyst in Example 27

| | |
|---|---|
| Conversion rate of naphtha (wt %) | 89.21 |
| Conversion rate of $CO_2$ (wt %) | 23.09 |
| Conversion rate of methanol (wt %) | 100.00 |
| Selectivity of ethylene and propylene in hydrocarbon products (wt %) | 12.29 |
| Selectivity of BTX in hydrocarbon products (wt %) | 70.15 |
| Selectivity of aromatic hydrocarbons in hydrocarbon products (wt %) | 74.25 |
| Selectivity of PX in hydrocarbon products (wt %) | 28.57 |
| Selectivity of PX in xylene products (wt %) | 96.07 |
| Composition of hydrocarbon products (wt %) | |
| Methane | 1.59 |
| Ethylene | 5.24 |
| Ethane | 2.71 |
| Propylene | 7.05 |

TABLE 21-continued

Reaction evaluation results of a catalyst in Example 27

| | |
|---|---|
| Propane | 3.34 |
| $C_4$ | 5.83 |
| Benzene | 8.42 |
| Toluene | 31.99 |
| Ethylbenzene | 1.03 |
| P-xylene | 28.57 |
| M-xylene | 0.76 |
| O-xylene | 0.41 |
| $C_{8+}$ aromatic hydrocarbons | 3.06 |

The above descriptions are only several examples of the present application, and are not intended to limit the present application in any way. Although the present application is disclosed above through preferred examples, the examples are not intended to limit the present application. For any skilled person familiar with the art, various changes or modifications made by using the technical contents disclosed above without departing from the scope of technical schemes of the present application are considered as equivalent examples, which fall within the scope of the technical schemes.

What is claimed is:

1. A method for preparing p-xylene, comprising introducing raw materials containing methanol, naphtha, and $CO_2$ into a reactor filled with a catalyst for a reaction to produce the p-xylene;
wherein conditions for the reaction are as follows: a reaction temperature is in a range from 450° C. to 650° C., a reaction pressure is in a range from 0.1 MPa to 3.5 MPa, a weight hourly space velocity of the naphtha is in a range from 0.1 $h^{-1}$ to 5 $h^{-1}$, a weight hourly space velocity of the $CO_2$ is in a range from 0.1 $h^{-1}$ to 3 $h^{-1}$, and a weight hourly space velocity of the methanol is in a range from 0.1 $h^{-1}$ to 5 $h^{-1}$;
wherein an mass amount ratio of the $CO_2$, the naphtha, and the methanol is (0.3-2):1:(0.3-2); and
wherein the acidic molecular sieve is an HZSM-5 zeolite molecular sieve.

2. The method according to claim 1, wherein conditions for the reaction are as follows: a reaction temperature is in a range from 500° C. to 600° C., a reaction pressure is in a range from 0.1 MPa to 3 MPa, a weight hourly space velocity of the naphtha is in a range from 0.5 $h^{-1}$ to 2 $h^{-1}$, a weight hourly space velocity of the $CO_2$ is in a range from 0.5 $h^{-1}$ to 2 $h^{-1}$, and a weight hourly space velocity of the methanol is in a range from 0.5 $h^{-1}$ to 2 $h^{-1}$.

3. The method according to claim 1, wherein the mass amount ratio of the $CO_2$, the naphtha, and the methanol is (0.3-1.5):1:(0.3-1.5).

4. The method according to claim 1, wherein components containing benzene and toluene in a mixture obtained after the reaction are separated from the mixture, the components are returned to a reaction system and co-fed with the raw materials for the reaction on the catalyst to produce the p-xylene.

5. The method according to claim 1, wherein the HZSM-5 zeolite molecular sieve has a silica-alumina ratio (Si/Al ratio) of 10-50.

6. The method according to claim 1, wherein the HZSM-5 zeolite molecular sieve is a metal-modified HZSM-5 zeolite molecular sieve.

7. The method according to claim 6, wherein a metal used for a metal modification is selected from at least one of La, Zn, Ga, Fe, Mo, and Cr.

8. The method according to claim 1, wherein the HZSM-5 zeolite molecular sieve is an HZSM-5 zeolite molecular sieve modified by a metal modification and a silanization reagent modification.

9. The method according to claim 8, wherein a silanization reagent used for the silanization reagent modification is selected from at least one of compounds with the following chemical formula:

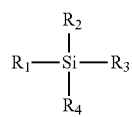

Formula I wherein $R_1$, $R_2$, $R_3$, and $R_4$ are independently selected from $C_{1-10}$ alkyl and $C_{1-10}$ alkoxyl.

10. The method according to claim 9, wherein at least one of the $R_1$, the $R_2$, the $R_3$, and the $R_4$ is selected from the $C_{1-10}$ alkoxyl.

11. The method according to claim 9, wherein the silanization reagent is selected from tetraethyl silicate and/or tetramethyl silicate.

12. The method according to claim 1, wherein before the reaction, the method further comprises a step of preparing the catalyst:
placing an HZSM-5 zeolite molecular sieve in a metal salt solution, and carrying out an impregnation, a drying, and a calcination to obtain a metal-modified HZSM-5 zeolite molecular sieve.

13. The method according to claim 12, wherein conditions for the impregnation are as follows: an impregnation temperature is in a range from 60° C. to 100° C., and an impregnation time is in a range from 2 to 10 hours.

14. The method according to claim 12, wherein a solid-liquid ratio of the HZSM-5 zeolite molecular sieve to the metal salt solution is 1:20 to 1:1.

15. The method according to claim 12, wherein a metal salt is a soluble metal salt corresponding to a metal used for a metal modification.

16. The method according to claim 12, wherein before the reaction, a preparation of the catalyst further comprises the following steps: subjecting a material containing a silanization reagent and the metal-modified HZSM-5 zeolite molecular sieve to a contact treatment, and carrying out a purging with an inert gas, followed by the calcination to obtain an HZSM-5 zeolite molecular sieve modified by a metal modification and a silanization reagent modification.

17. The method according to claim 16, wherein the contact treatment is carried out at a temperature of a range from 250° C. to 450° C.

18. The method according to claim 16, wherein a weight hourly space velocity of the silanization reagent is in a range from 0.02 $h^{-1}$ to 0.5 $h^{-1}$.

19. The method according to claim 1, wherein the reactor is a fixed bed reactor, a fluidized bed reactor, or a moving bed reactor.

* * * * *